(12) United States Patent
Mochizuki et al.

(10) Patent No.: US 10,570,954 B2
(45) Date of Patent: Feb. 25, 2020

(54) ROTATION RING

(71) Applicant: THK CO., LTD., Tokyo (JP)

(72) Inventors: Hiroaki Mochizuki, Tokyo (JP); Keisuke Hagiwara, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/777,993

(22) PCT Filed: Oct. 14, 2016

(86) PCT No.: PCT/JP2016/080610
§ 371 (c)(1),
(2) Date: May 22, 2018

(87) PCT Pub. No.: WO2017/090337
PCT Pub. Date: Jun. 1, 2017

(65) Prior Publication Data
US 2018/0340569 A1 Nov. 29, 2018

(30) Foreign Application Priority Data

Nov. 26, 2015 (JP) ................................. 2015-231044

(51) Int. Cl.
*F16C 19/16* (2006.01)
*F16C 33/32* (2006.01)
(Continued)

(52) U.S. Cl.
CPC ............ *F16C 19/16* (2013.01); *F16C 19/166* (2013.01); *F16C 19/20* (2013.01); *F16C 19/505* (2013.01);
(Continued)

(58) Field of Classification Search
CPC ........ F16C 19/166; F16C 19/20; F16C 33/32; F16C 33/3713; F16C 33/372; F16C 33/374; F16C 2314/73
See application file for complete search history.

(56) References Cited

U.S. PATENT DOCUMENTS 2,400,374 A * 5/1946 Selnes ................... F16C 19/505
384/49
3,425,759 A * 2/1969 Schwarzschild ........ F16C 33/32
384/491

(Continued)

FOREIGN PATENT DOCUMENTS

EP  1 296 074 A2  3/2003
EP  2 357 372 A1  8/2011
(Continued)

OTHER PUBLICATIONS

International Search Report dated Dec. 27, 2016, issued in Counterpart of International Application No. PCT/JP2016/080610 (2 pages).

(Continued)

*Primary Examiner* — Thomas R Hannon
(74) *Attorney, Agent, or Firm* — Westerman, Hattori, Daniels & Adrian, LLP; John P. Kong

(57) ABSTRACT

This rotation ring includes an inner ring with a first rolling element travel groove, an outer ring with a second rolling element travel groove that faces the first rolling element travel groove, and a plurality of rolling elements interposed between the first rolling element travel groove and the second rolling element travel groove. The plurality of rolling elements include a plurality of hard rolling elements disposed at intervals in the circumferential direction, and a plurality of soft rolling elements, at least three or more of which are disposed between the hard rolling elements adja- (Continued)

cent to each other in the circumferential direction and which are lower in rigidity than the hard rolling elements.

5 Claims, 8 Drawing Sheets

(51) Int. Cl.
    *F16C 19/20*     (2006.01)
    *F16C 19/50*     (2006.01)
    *F16C 33/58*     (2006.01)
    *F16C 39/02*     (2006.01)

(52) U.S. Cl.
    CPC .............. *F16C 33/32* (2013.01); *F16C 33/58* (2013.01); *F16C 33/581* (2013.01); *F16C 39/02* (2013.01); *F16C 2314/73* (2013.01); *F16C 2326/24* (2013.01)

(56) References Cited

U.S. PATENT DOCUMENTS

| | | | | |
|---|---|---|---|---|
| 3,764,188 | A * | 10/1973 | Suska | F16C 19/20 384/463 |
| 5,967,670 | A * | 10/1999 | Gabelli | F16C 33/303 384/491 |
| 6,837,623 | B2 * | 1/2005 | Shirokoshi | F16C 19/166 29/898.06 |
| 7,614,793 | B2 * | 11/2009 | Del Rio | A61B 17/1624 384/454 |
| 9,593,718 | B2 * | 3/2017 | Kario | F16C 33/64 |
| 2005/0105838 | A1 * | 5/2005 | Brauer | F16C 19/20 384/492 |
| 2006/0013519 | A1 * | 1/2006 | Fukunaga | F16C 19/166 384/450 |

FOREIGN PATENT DOCUMENTS

| | | |
|---|---|---|
| JP | 49-15839 A | 2/1974 |
| JP | 50-61232 U | 6/1975 |
| JP | 62-30022 U | 2/1987 |
| JP | 2-74625 U | 6/1990 |
| JP | 2002-339979 A | 11/2002 |
| JP | 2004-218790 A | 8/2004 |
| JP | 2008-185062 A | 8/2008 |

OTHER PUBLICATIONS

Office Action dated Jul. 2, 2019, issued in counterpart EP Application No. 16868286.2 (7 pages).

* cited by examiner

ROTATION RING

TECHNICAL FIELD

The present invention relates to a rotation ring.

Priority is claimed on Japanese Patent Application No. 2015-231044, filed on Nov. 26, 2015, the content of which is incorporated herein by reference.

BACKGROUND ART

As a rotation ring having an inner ring with a first rolling element travel groove, an outer ring with a second rolling element travel groove facing the first rolling element travel groove, and a plurality of rolling elements interposed between the first rolling element travel groove and the second rolling element travel groove, for instance, a bearing device in which an object is mounted on at least one of the inner ring and the outer ring is widely known.

A bearing device for a steering column in which three or more resin balls and three or more steel balls having smaller diameters than that of the resin balls are disposed between an outer ring and an inner ring in a circumferential direction is disclosed in Patent Literature 1 shown below. According to this configuration, a large load in the event of collision is received by the steel balls and a variation in a radial gap of a bearing is absorbed by minute deformation of the resin balls, and thus rattling or the like of a steering shaft can be prevented.

CITATION LIST

Patent Literature

[Patent Literature 1]
Japanese Unexamined Patent Application, First Publication No. 2004-218790

SUMMARY OF INVENTION

Technical Problem

Meanwhile, Patent Literature 1 describes that, considering that it is favorable for a radial load during normal rotation and a large load in the event of vehicle collision or the like to be uniformly dispersed and applied in a circumferential direction, it is advantageous to suppress a sequence of the same type of balls in the circumferential direction to two and for the same type of balls to be disposed at regular intervals in the circumferential direction (see paragraph [0026] of Patent Literature 1).

However, when the sequence of the same type of balls in the circumferential direction is suppressed to two, for instance, one of the three balls is necessarily disposed in a different size, and thus a rate at which the balls come into contact with the inner ring and the outer ring during the normal rotation is reduced to at least two-thirds or less. In this case, load resistance of the bearing device is also reduced to two-thirds or less, and thus it is difficult to support a heavy object. Further, by that the rate at which the balls come into contact with the inner ring and the outer ring is reduced, there is a possibility that smoothness of relative rotation between the inner ring and the outer ring will be lost. For this reason, it is difficult to apply the bearing device as a bearing device of a seat or the like that supports a heavy object and requires smoothness of rotation.

The present invention provides a rotation ring capable of realizing load resistance and smoothness of rotation during normal rotation, and durability against a large load applied in an emergency.

Solution to Problem

According to a first aspect of the present invention, a rotation ring includes: an inner ring with a first rolling element travel groove, an outer ring with a second rolling element travel groove facing the first rolling element travel groove, and a plurality of rolling elements interposed between the first rolling element travel groove and the second rolling element travel groove. The plurality of rolling elements include a plurality of hard rolling elements that are disposed at intervals in a circumferential direction, and a plurality of soft rolling elements, at least three or more of which are disposed between the hard rolling elements adjacent to each other in the circumferential direction and which are lower in rigidity than the hard rolling elements.

According to a second aspect of the present invention, at least one of the inner ring and the outer ring may have a mounting part that allows an object to be mounted in an axial direction.

According to a third aspect of the present invention, the first rolling element travel groove and the second rolling element travel groove may have Gothic arch shapes.

According to a fourth aspect of the present invention, the hard rolling elements may be smaller than an elastically deformable size of the soft rolling elements.

According to a fifth aspect of the present invention, surfaces of the hard rolling elements may have larger friction coefficients than surfaces of the soft rolling elements.

Advantageous Effects of Invention

According to the rotation ring of the present invention, load resistance and smoothness of rotation during normal rotation, and durability against a large load applied in an emergency can all be realized.

DESCRIPTION OF EMBODIMENTS

Hereinafter, an embodiment of the present invention will be described with reference to the drawings.

In each drawings, components may be illustrated on different dimensional scales so that they can be easily seen.

Figure 1:
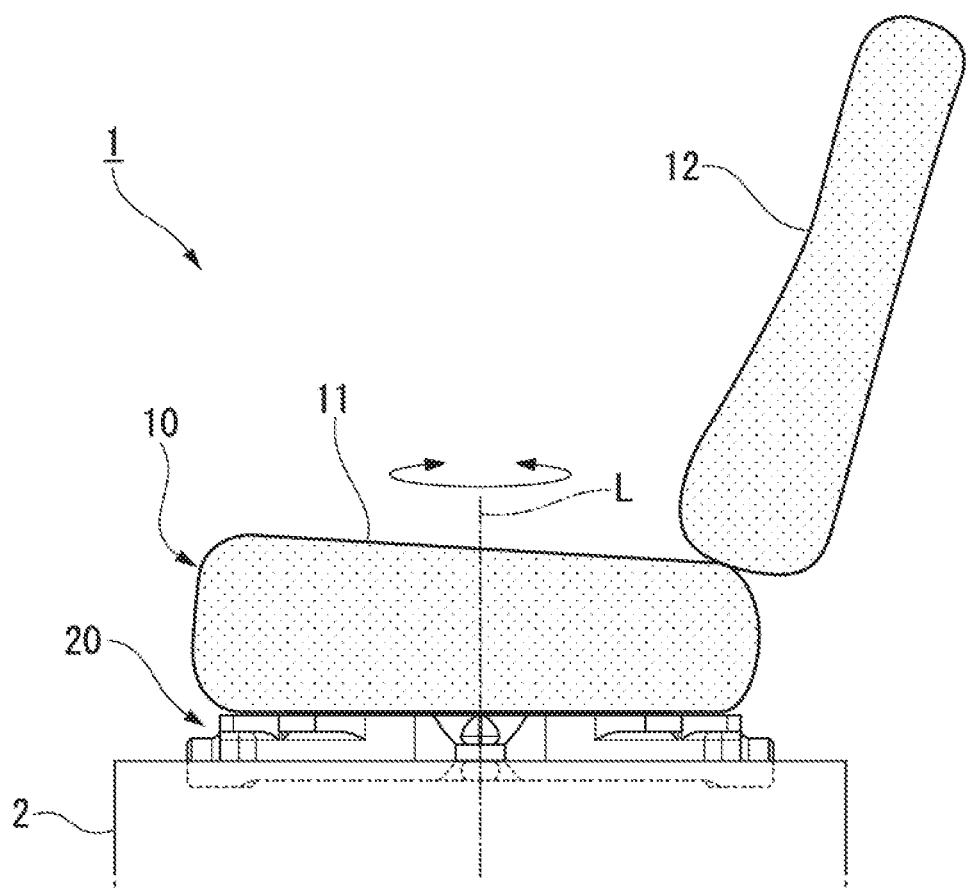
FIG. 1 is a side view of a rotation ring 1 in an embodiment of the present invention.

FIG. 1 is a side view of a rotation ring 1 in an embodiment of the present invention.

The rotation ring 1 configures a bearing device 20 on which a seat member 10 is mounted. The seat member 10 has a seat 11 on which a sitter sits, and a backrest 12 that supports the back of the sitter sitting on the seat 11. The bearing device 20 is fixed on a base 2, and supports the seat member 10 to be rotatable about a rotational axis L. In the following description, a direction in which the rotational axis L extends is referred to as an axial direction, and a direction perpendicular to the direction in which the rotational axis L extends is referred to as a radial direction.

Figure 2:
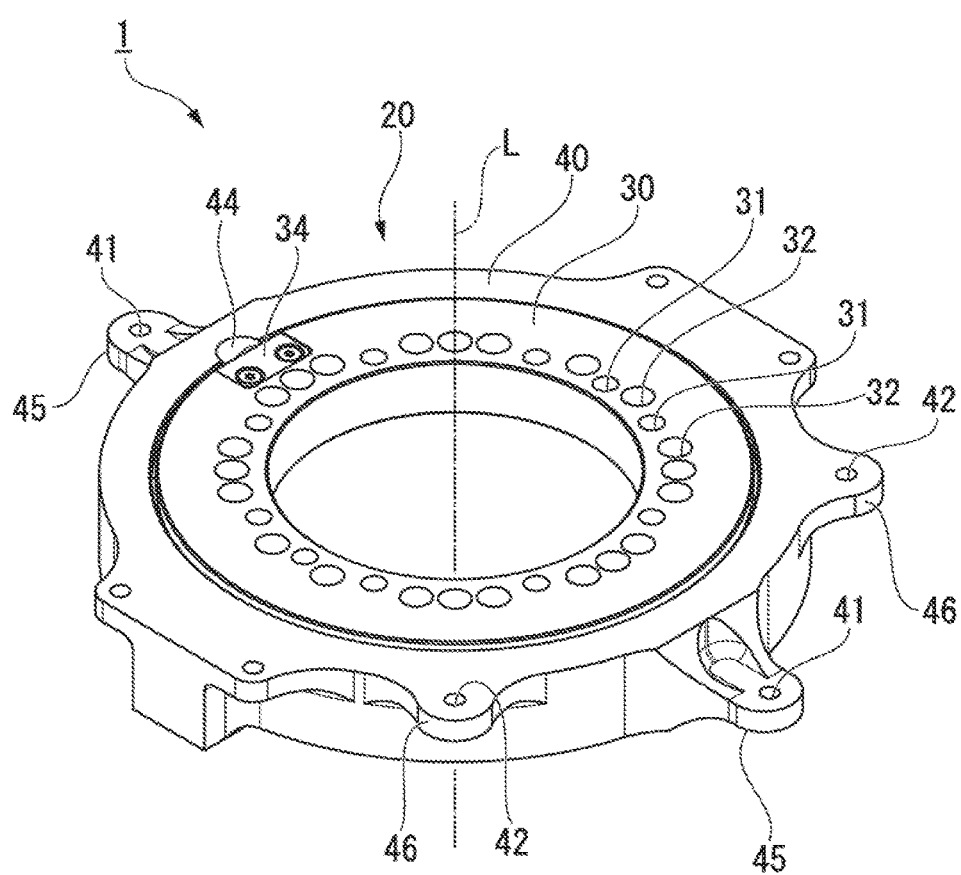
FIG. 2 is a perspective view of a top side of the bearing device 20 in the embodiment of the present invention.
Figure 3:
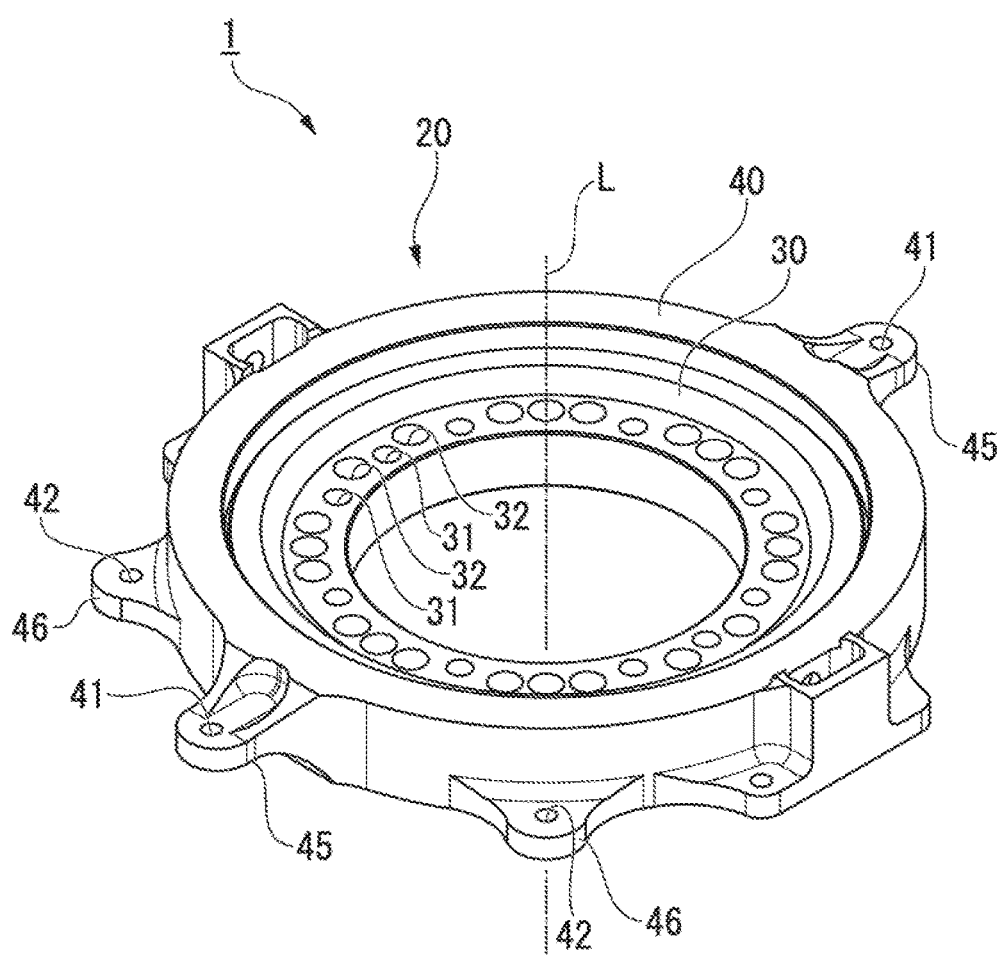
FIG. 3 is a perspective view of a bottom side of the bearing device 20 in the embodiment of the present invention.
Figure 4:
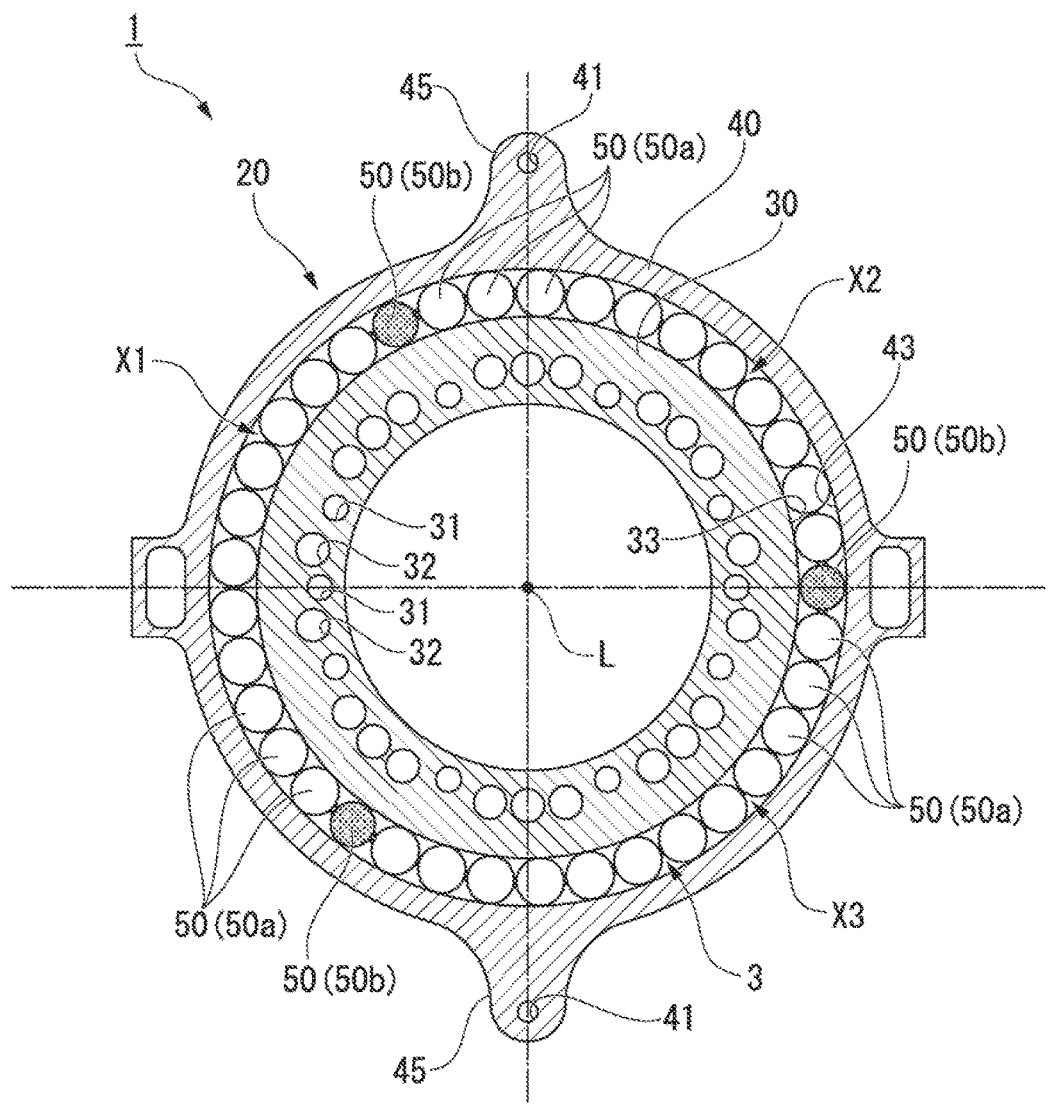
FIG. 4 is a cross-sectional view of the bearing device 20 in the embodiment of the present invention.

FIG. 2 is a perspective view of a top side of the bearing device 20 in the embodiment of the present invention. FIG. 3 is a perspective view of a bottom side of the bearing device 20 in the embodiment of the present invention. FIG. 4 is a cross-sectional view of the bearing device 20 in the embodiment of the present invention.

The bearing device 20 has an inner ring 30 and an outer ring 40 illustrated in FIGS. 2 and 3, and a plurality of rolling elements 50 illustrated in FIG. 4.

The inner ring 30 is formed in an approximately annular shape as illustrated in FIGS. 2 and 3, and has a plurality of mounting holes (mounting parts) 31 with which the seat member (the object) 10 can be mounted in the axial direction, a plurality of lightening holes 32 that are formed to reduce weight, and a first rolling element travel groove 33 along which the rolling elements 50 roll as illustrated in FIG. 4. A lid 34 illustrated in FIG. 2 closes an insertion port for the rolling elements 50. The lid 34 is mounted on the inner ring 30 by screws.

The mounting holes 31 are through-holes formed through the inner ring 30 in the axial direction.

Bolts or the like for fixing the seat member 10 are disposed in the mounting holes 31. The plurality of mounting holes 31 are formed in an edge of a central opening of the inner ring 30 at intervals in a circumferential direction.

The lightening holes 32 are through-holes formed through the inner ring 30 in the axial direction. The lightening holes 32 have a larger diameter than the mounting holes 31. At least one or more of the lightening holes 32 are formed between the mounting holes 31 adjacent to each other in a circumferential direction.

Figure 5:
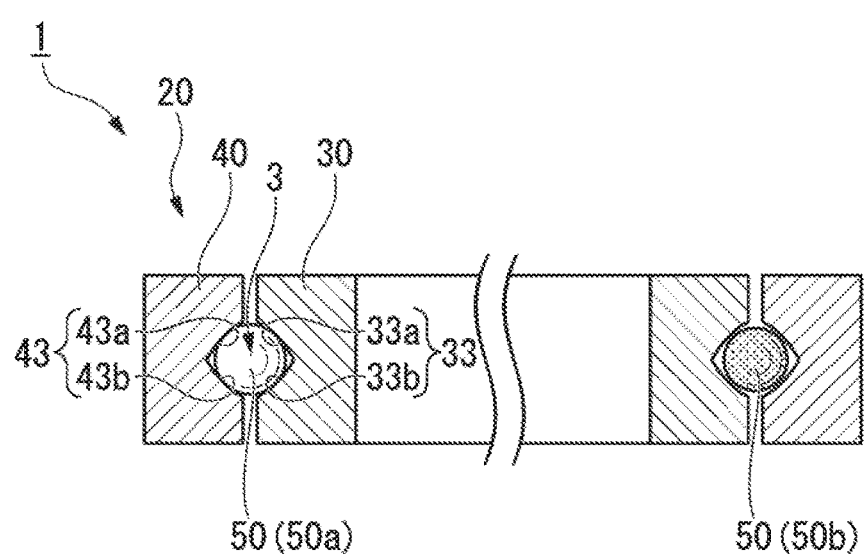
FIG. 5 is a view schematically illustrating a cross section of the bearing device 20 in the embodiment of the present invention.

FIG. 5 is a view schematically illustrating a cross section of the bearing device 20 in the embodiment of the present invention.

As illustrated in FIG. 5, the first rolling element travel groove 33 is formed in an outer circumferential surface of the inner ring 30.

The first rolling element travel groove 33 has a so-called Gothic arch shape. That is, the first rolling element travel groove 33 has a first groove surface 33a that is formed on one side in the axial direction with reference to a center of the groove, and a second groove surface 33b that is formed on the other side in the axial direction.

Each of the first groove surface 33a and the second groove surface 33b has a circular arc shape formed in symmetry with reference to the center of the groove. The centers of the circular arc shapes of the first groove surface 33a and the second groove surface 33b are not coincident with each other, and the first rolling element travel groove 33 is formed such that the portion of the middle of the groove is pointed. The rolling elements 50 (soft rolling elements 50a to be described below) roll in contact with the first groove surface 33a and the second groove surface 33b.

As illustrated in FIGS. 2 and 3, the outer ring 40 is disposed on an outer circumference side of the inner ring 30. The outer ring 40 is formed in an approximately annular shape. The outer ring 40 has first mounting holes (mounting parts) 41 that enables the outer ring 40 to be mounted on the base (the object) 2 in the axial direction, second mounting holes 42 with which a member other than the base 2 and the seat member 10 can be mounted, and a second rolling element travel groove 43 along which the rolling elements 50 roll as illustrated in FIG. 4. A groove 44 illustrated in FIG. 2 forms the insertion port for the rolling elements 50. The groove 44 is formed in the outer ring 40.

The first mounting holes 41 are through-holes that are formed in a pair of protrusion parts 45, which are provided to protrude from an outer circumferential surface of the outer ring 40 in the radial direction, through the protrusion parts 45 in the axial direction. Bolts or the like for fixture to the base 2 are disposed in the first mounting holes 41. The pair of protrusion parts 45 are fixed to the base 2 in a state in which they extend in a leftward/rightward direction of the seat member 10 (see FIG. 6 to be described below).

The second mounting holes 42 are through-holes that are formed in flange parts 46, which are provided to protrude from the outer circumferential surface of the outer ring 40 in the radial direction, through the flange parts 46 in the axial direction. The second mounting holes 42 are disposed approximately on the same radius as the first mounting holes 41 in the radial direction.

As illustrated in FIG. 5, the second rolling element travel groove 43 is formed in an inner circumferential surface of the outer ring 40.

The second rolling element travel groove 43 faces the first rolling element travel groove 33 in the radial direction. The second rolling element travel groove 43 has a so-called Gothic arch shape. That is, the second rolling element travel groove 43 has a first groove surface 43a that is formed on one side in the axial direction with reference to the center of the groove, and a second groove surface 43b that is formed on the other side in the axial direction.

Each of the first groove surface 43a and the second groove surface 43b has a circular arc shape formed in symmetry with reference to the center of the groove. The centers of the circular arc shapes of the first groove surface 43a and the second groove surface 43b are not coincident with each other, and the second rolling element travel groove 43 is formed such that the portion of the middle of the groove is pointed. The rolling elements 50 (soft rolling elements 50a to be described below) roll in contact with the first groove surface 43a and the second groove surface 43b.

As illustrated in FIG. 4, the rolling elements 50 are interposed between the first rolling element travel groove 33 and the second rolling element travel groove 43. As the first rolling element travel groove 33 and the second rolling element travel groove 43 face each other, a rolling element travel passage 3 is formed on a part facing each other. The inner ring 30 and the outer ring 40 are relatively rotatable about the rotational axis L by that the rolling elements 50 roll along the rolling element travel passage 3 formed in an annular shape around the rotational axis L.

The rolling elements 50 include a plurality of soft rolling elements 50a and a plurality of hard rolling elements 50b.

The soft rolling elements 50a are formed of a material having lower rigidity than the hard rolling elements 50b. The soft rolling elements 50a of the present embodiment are balls formed of a resin material such as POM (polyacetal). During the normal rotation, the soft rolling elements 50a roll along the rolling element travel passage 3 in a state in which a load is applied. That is, the soft rolling elements 50a roll in four-point contact with the first and second groove surfaces 33a and 33b of the first rolling element travel groove 33 and the first and second groove surfaces 43a and 43b of the second rolling element travel groove 43 as illustrated in FIG. 5 while being elastically deformed.

The hard rolling elements 50b are formed of a material having higher rigidity than the soft rolling elements 50a. The hard rolling elements 50b of the present embodiment are balls formed of a steel material such as stainless steel. The hard rolling elements 50b are not limited to the steel material, and may be formed of, for instance, a ceramic material. During the normal rotation, the hard rolling elements 50b roll along the rolling element travel passage 3 in a state in which a load is not applied. That is, the hard rolling elements 50b are formed to be smaller than an elastically deformable size of the soft rolling elements 50a. Diameters of the hard rolling elements 50b are smaller than those of the soft rolling elements 50a by about 10%. For this reason, during the normal rotation, the hard rolling elements 50b are not in four-point contact with the first rolling element travel groove 33 and the second rolling element travel groove 43 and receive no load. The hard rolling elements 50b receive a load when the soft rolling elements 50a are subjected to plastic deformation.

Surfaces of the hard rolling elements 50b have higher friction coefficients than surfaces of the soft rolling elements 50a. That is, the surfaces of the soft rolling elements 50a are polished after molding. In contrast, the surfaces of the hard rolling elements 50b are not polished after forming, and are rougher than those of the soft rolling elements 50a. As described above, since the hard rolling elements 50b receive no load during the normal rotation, even when the friction is high, the rolling of the soft rolling elements 50a, and furthermore smoothness of the relative rotation between the inner ring 30 and the outer ring 40 is not deteriorated.

As illustrated in FIG. 4, the plurality of hard rolling elements 50b are disposed at intervals in a circumferential direction of the rolling element travel passage 3. At least three or more soft rolling elements 50a are disposed between the neighboring hard rolling elements 50b in the circumferential direction. To be specific, three of the hard rolling elements 50b of the present embodiment are disposed at intervals in the circumferential direction. The soft rolling elements 50a of the present embodiment are configured such that eleven thereof are disposed in a first region X1 between the neighboring hard rolling elements 50b in the circumferential direction, eleven thereof are disposed in a second region X2, and twelve thereof are disposed in a third region X3.

In this way, the plurality of rolling elements 50 include the plurality of hard rolling elements 50b that are disposed at intervals in the circumferential direction, and at least three or more of the plurality of soft rolling elements 50a that are disposed between the neighboring hard rolling elements 50b in the circumferential direction. For this reason, the load resistance and the smoothness of rotation during the normal rotation can be secured. That is, at least three out of the four rolling elements 50 that are continuous in the circumferential direction are soft rolling elements 50a, and thus a rate at which the rolling elements 50 come into contact with the inner ring 30 and the outer ring 40 during the normal rotation can be secured at 75% or higher.

According to the present embodiment illustrated in FIG. 4, since 34 out of the 37 rolling elements 50 are the soft rolling elements 50a, about 92% of the rolling elements 50 come into contact with the inner ring 30 and the outer ring 40. For this reason, a reduction in the load resistance of the bearing device 20 can be suppressed to about 8%. Since the soft rolling elements 50a constituting most of the rolling elements 50 roll along the rolling element travel passage 3 with a load applied, the smoothness of the relative rotation between the inner ring 30 and the outer ring 40 is not deteriorated. When the soft rolling elements 50a are subjected to a load and are elastically deformed, a strong feeling (stickiness) unique to the resin material can be given in the rotation operation of the seat member 10.

Next, an operation of the hard rolling elements 50b will be described with reference to FIGS. 6 and 7.

Figure 6:
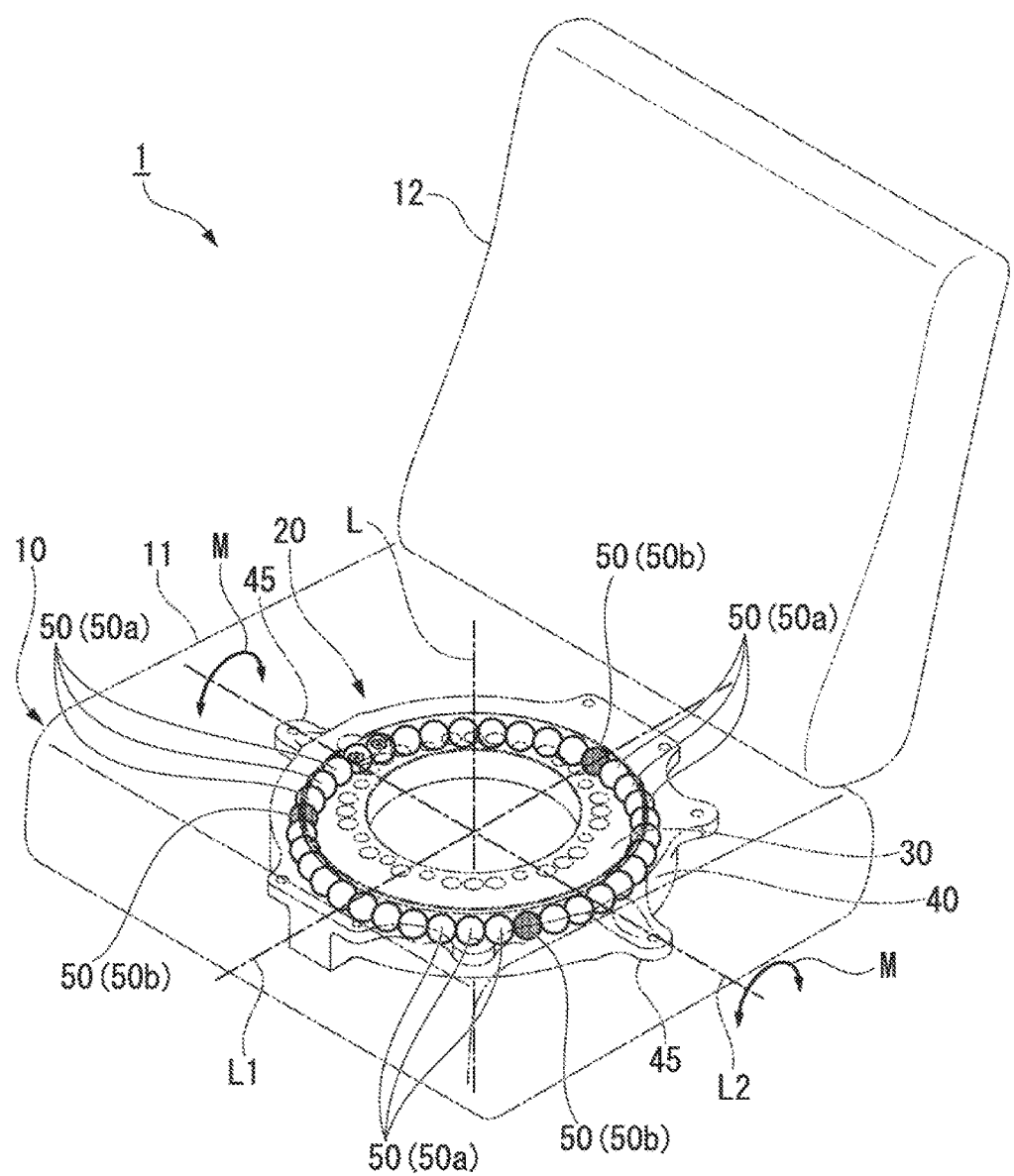
FIG. 6 is a view illustrating a state when very great momentum M is applied to the rotation ring 1 in the embodiment of the present invention.

FIG. 6 is a view illustrating a state when very great momentum M is applied to the rotation ring 1 in the embodiment of the present invention. FIG. 7 is a view illustrating an operation of the hard rolling element 50b in the embodiment of the present invention.

When the rotation ring 1 is installed on a moving body such as a vehicle or an airplane, it receives a very large load in the event of sudden stop, sudden acceleration, or collision of the moving body. When this load is applied in the radial direction of the seat member 10 (for instance, in a forward/backward direction in which the axis L1 extends), very great momentum M is applied to the bearing device 20 around an axis L2 extending in a leftward/rightward direction (see FIG. 6). The momentum M rotates the inner ring 30 fixed to the seat member 10 with respect to the outer ring 40 fixed to the base 2 around the axis extending in the leftward/rightward direction, and gives a shear force to the plurality of rolling elements 50 interposed between the inner ring 30 and the outer ring 40.

The plurality of rolling elements 50 include the hard rolling elements 50b having higher rigidity than the soft rolling elements 50a. The hard rolling elements 50b are smaller than an elastically deformable size of the soft rolling elements 50a, and do not contribute to the relative rotation between the inner ring 30 and the outer ring 40 during the normal rotation, but are caught between the inner ring 30 and the outer ring 40 when the soft rolling elements 50a are plastically deformed due to a shear force, thereby disassembly of the bearing device 20 is prevented. That is, the hard rolling elements 50b obviate the soft rolling elements 50a from being divided into two due to the shear force, and improve durability of the bearing device 20 against a large load applied in an emergency.

In the present embodiment, as illustrated in FIG. 4, the three hard rolling elements 50b are disposed at intervals of about 120° in the circumferential direction. For this reason, the hard rolling elements 50b are not linearly aligned on an action axis of the momentum M (an axis perpendicular to the rotational axis L (the axis L2 in the example illustrated in FIG. 4)), and at least one of the hard rolling elements 50b can receive the momentum M when the momentum M illustrated in FIG. 6 is applied. In this way, the hard rolling elements 50b are preferably not aligned linearly, and an interval that is greater than 90° and is less than 180° is preferably placed, for instance, between the neighboring hard rolling elements 50b in the circumferential direction. As long as this condition is met, the hard rolling elements 50b may be disposed at irregular intervals instead of at strict intervals of 120°, and a degree of freedom for design can be increased.

Figure 7:
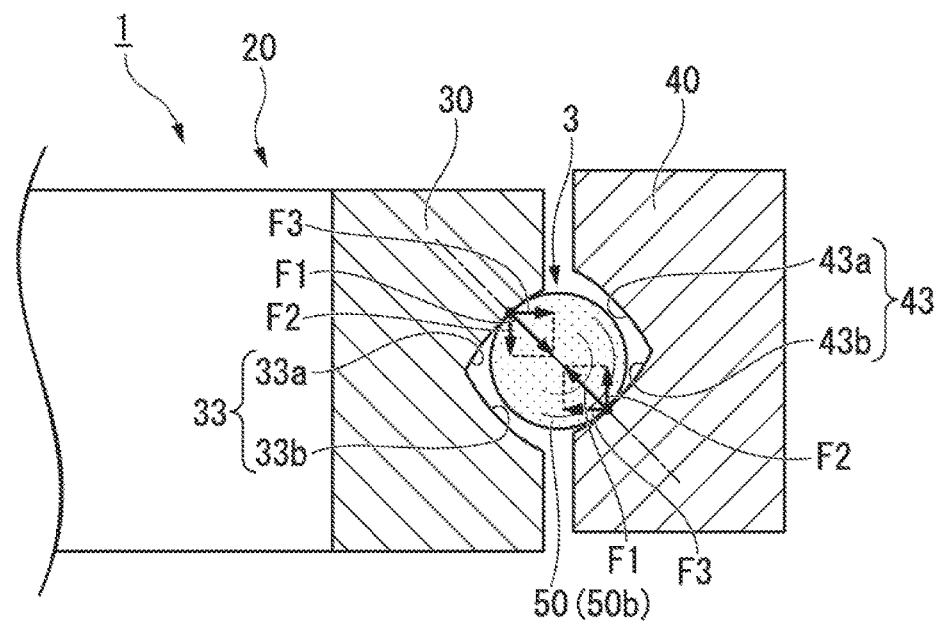
FIG. 7 is a view illustrating an operation of the hard rolling element 50b in the embodiment of the present invention.

As illustrated in FIG. 7, the first rolling element travel groove 33 and the second rolling element travel groove 43 have Gothic arch shapes. According to this configuration, a direction of a load F1 which the hard rolling elements 50b receive via the first rolling element travel groove 33 and the second rolling element travel groove 43 is inclined, and a part of this load (a component force F3 in the radial direction) can be imposed on the inner ring 30 or the outer ring 40, and thereby a shear force which the hard rolling elements 50b receive due to the load F1 (a component force F2 in the axial direction) can be relatively reduced.

Figure 8:
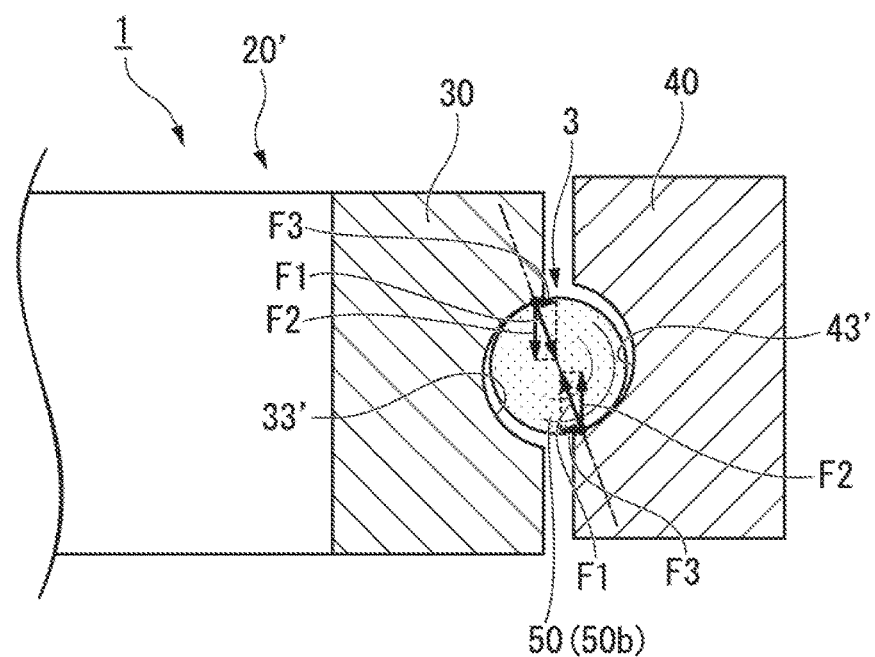
FIG. 8 is a view schematically illustrating a cross section of a bearing device 20' of a comparative example.

FIG. 8 is a view schematically illustrating a cross section of a bearing device 20' of a comparative example.

The bearing device 20' illustrated in FIG. 8 includes a first rolling element travel groove 33' and a second rolling element travel groove 43', each of which has a so-called circular arc shape of a single circular arc. In this configuration, a direction of a load F1 which the hard rolling elements 50b receive via the first rolling element travel groove 33' and the second rolling element travel groove 43' becomes an approximately vertical direction due to a variation of contact, a rate (a component force F3) at which the inner ring 30 or the outer ring 40 bears the load F1 is reduced, and a rate (a component force F2) at which the hard rolling elements 50b bear the load F1 is relatively increased.

In the present embodiment, since the first rolling element travel groove 33 and the second rolling element travel groove 43 have the Gothic arch shapes as illustrated in FIG. 7, a possibility of the hard rolling elements 50b receiving almost the whole load F1 as the shear force as a single body is eliminated as in the case in which each of the first and second rolling element travel grooves 33 and 43 has the so-called circular arc shape of the single circular arc illustrated in FIG. 8. For this reason, the shearing of the hard rolling elements 50b is prevented, and durability of the bearing device 20 can be improved.

The surfaces of the hard rolling elements 50b have the greater friction coefficients than those of the soft rolling elements 50a. For this reason, slip of the hard rolling elements 50b against the first and second rolling element travel grooves 33 and 43 when the hard rolling elements 50b are sandwiched between the inner ring 30 and the outer ring 40 can be suppressed. Thereby, the hard rolling elements 50b are easily strongly sandwiched (bit) between the inner ring 30 and the outer ring 40, and disassembly of the inner ring 30 and the outer ring 40 can be suitably prevented.

In this way, according to the aforementioned present embodiment, the rotation ring 1 in which the outer ring 40 is mounted on the base 2 via the first mounting holes 41 in the axial direction and the inner ring 30 is mounted on the seat member 10 via the mounting holes 31 in the axial direction adopts the configuration in which the plurality of rolling elements 50 include the plurality of hard rolling elements 50b that are disposed at intervals in the circumferential direction, and the plurality of soft rolling elements 50a, at least three or more of which are disposed between the neighboring hard rolling elements 50b in the circumferential direction and which are lower in rigidity than the hard rolling elements 50b. Thereby, the load resistance and the smoothness of the rotation during the normal resistance, and the durability against the large load applied in an emergency can be realized.

While the preferred embodiment of the present invention has been described with reference to the drawings, the present invention is not limited to the above embodiment. All the shapes and combinations of the components shown in the aforementioned embodiment are only examples and can be variously modified on the basis of design requirements without departing from the scope of the present invention.

For example, modified examples represented below can be adopted. In the following description, components identical or equivalent to those of the aforementioned embodiment are given the same reference signs, and description thereof is simplified or omitted.

Figure 9:
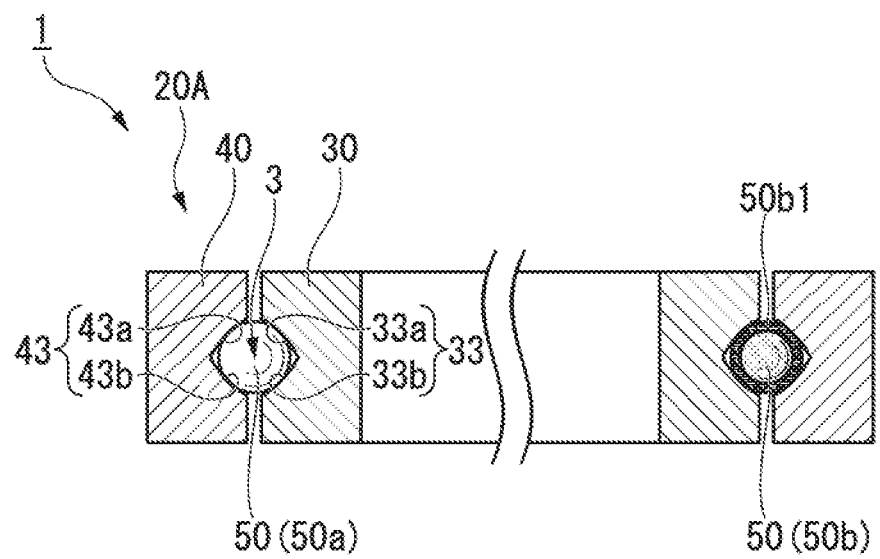
FIG. 9 is a view schematically illustrating a cross section of a bearing device 20A in a modified example of the present invention.

FIG. 9 is a view schematically illustrating a cross section of a bearing device 20A in a modified example of the present invention.

Each hard rolling element 50b illustrated in FIG. 9 has a coating layer 50b1 on a surface thereof. The coating layer 50b1 is formed of the same resin material as each soft rolling element 50a. The coating layer 50b1 has an elastically deformable thickness as in the soft rolling element 50a. A diameter of the hard rolling element 50b including the coating layer 50b1 is the same diameter as the soft rolling element 50a. A surface of the coating layer 50b1 is polished in the same way as that of the soft rolling element 50a. According to this configuration, since a load is also applied to the hard rolling element 50b during normal rotation, load resistance and smoothness of rotation during the normal rotation are further improved. When a large load is applied in an emergency and the coating layer 50b1 is damaged, the hard rolling element 50b is exposed, and thus durability of the bearing device 20A can be improved like the above embodiment.

Figure 10:
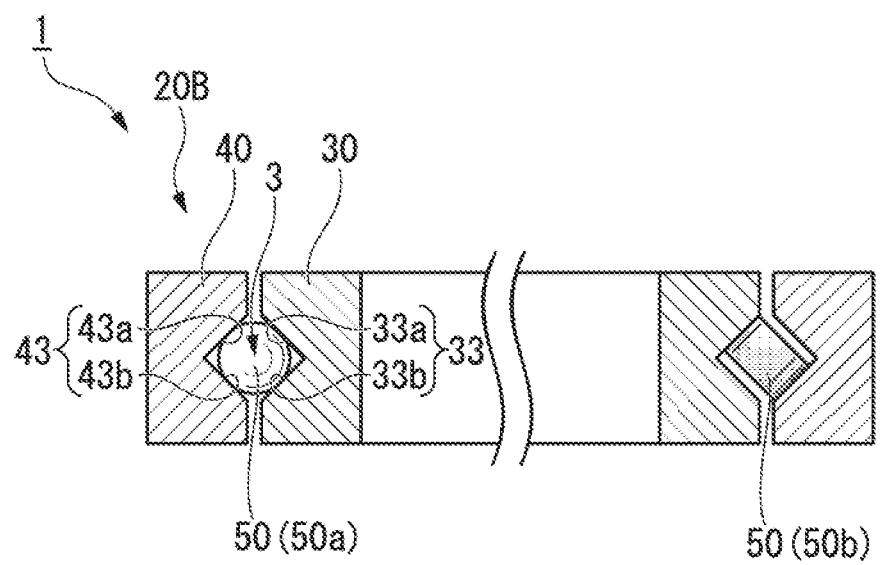
FIG. 10 is a view schematically illustrating a cross section of a bearing device 20B in a modified example of the present invention.

FIG. 10 is a view schematically illustrating a cross section of a bearing device 20B in a modified example of the present invention.

Each hard rolling element 50b illustrated in FIG. 10 has a roller shape. Since the roller shape is a shape that is more resistant to a load than a ball shape, durability of the bearing device 20B can be further improved. Each soft rolling element 50a may also have a roller shape.

If the hard rolling element 50b is small and does not contribute to relative rotation between an inner ring 30 and an outer ring 40, the shape of the hard rolling element 50b does not particularly matter, but is preferably a shape in which rolling of the soft rolling elements 50a is not impeded.

For example, in the embodiment, the configuration in which the seat member 10 is mounted on the inner ring 30 has been described, but a configuration in which the seat member 10 is mounted on the outer ring 40 may be adopted. A configuration in which another member (an apparatus, a machine, etc.) other than the seat member 10 is mounted on at least one of the inner ring 30 and the outer ring 40 may be adopted. The rotation ring 1 may be a state in which the member is not mounted (the bearing device 20 alone).

For example, the soft rolling elements 50a may be formed of polyethylene (PE), polypropylene (PP), polytetrafluoroethylene (PTFE), polyetheretherketone (PEEK), polyamide (PA) or the like.

INDUSTRIAL APPLICABILITY

According to the aforementioned rotation ring, the load resistance and the smoothness of rotation during the normal rotation and the durability against the large load applied in an emergency can be realized.

REFERENCE SIGNS LIST

1 Rotation ring
2 Base (object)

10 Seat member (object)
30 Inner ring
31 Mounting hole (mounting part)
33 First rolling element travel groove
40 Outer ring
41 First mounting hole (mounting part)
43 Second rolling element travel groove
50 Rolling element
50a Soft rolling element
50b Hard rolling element
L Rotational axis

The invention claimed is:

1. A rotation ring comprising:
an inner ring with a first rolling element travel groove;
an outer ring with a second rolling element travel groove facing the first rolling element travel groove; and
a plurality of rolling elements interposed between the first rolling element travel groove and the second rolling element travel groove,
wherein the plurality of rolling elements include a plurality of hard rolling elements that are disposed at intervals in a circumferential direction, and a plurality of soft rolling elements, at least three or more of which are disposed between the hard rolling elements adjacent to each other in the circumferential direction and which are lower in rigidity than the hard rolling elements, and
wherein the hard rolling elements are smaller than an elastically deformable size of the soft rolling elements.

2. The rotation ring according to claim 1, wherein at least one of the inner ring and the outer ring has a mounting part that allows an object to be mounted in an axial direction.

3. The rotation ring according to claim 1, wherein the first rolling element travel groove and the second rolling element travel groove have Gothic arch shapes.

4. The rotation ring according to claim 1, wherein the hard rolling elements roll along a rolling element travel passage formed on a part in which the first rolling element travel groove and the second rolling element travel groove face each other, in a state in which no load is applied, when the soft rolling elements are in the elastically deformable size.

5. The rotation ring according to claim 1,
wherein surfaces of the hard rolling elements have larger friction coefficients than surfaces of the soft rolling elements.

* * * * *